Feb. 20, 1968 N. O. JOHANNESSON ET AL 3,370,134

FAULT RECORDING ARRANGEMENT

Filed April 30, 1964 2 Sheets-Sheet 1

INVENTORS
NILS OLOF JOHANNESSON
SVERRE NORMANN TRONSLI
BY
Hane and Nydick
ATTORNEYS INVENTORS
NILS OLOF JOHANNESSON
SVERRE NORMANN TRONSLI
BY
Hane and Nydick
ATTORNEYS 3,370,134

FAULT RECORDING ARRANGEMENT

Nils Olof Johannesson and Sverre Normann Tronsli, Hagersten, Sweden, assignors to Telefonaktiebolaget L M Ericsson, Stockholm, Sweden, a corporation of Sweden Filed Apr. 30, 1964, Ser. No. 363,865
Claims priority, application Sweden, May 27, 1963, 5,813/63
3 Claims. (Cl. 179—175.31)

ABSTRACT OF THE DISCLOSURE

There is disclosed apparatus for indicating a defective intermediate repeater in a carrier frequency transmission system utilizing coaxial cables in each direction of transmission. The intermediate repeaters are fed serially with an operating direct voltage, one conductor of the cable being the feed conductor and the other conductor the return. In each repeater there is a fault monitoring device which includes a relay. The relay, when a fault is detected, short circuits a special line pair to send an alarm signal to a terminal station.

Figure 1:
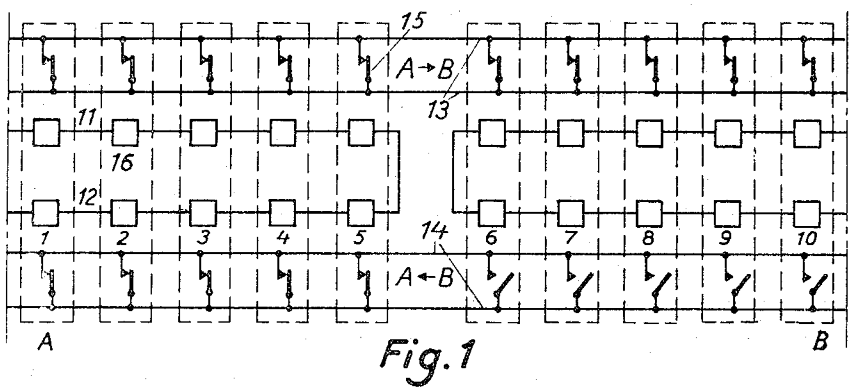

The present invention relates to an arrangement for indicating a defective intermediate repeater in carrier frequency transmission systems, where the transmission occurs through cables, for instance coaxial cables, with one conductor pair for each transmission direction. The intermediate repeaters are fed with direct voltage in series, whereby one conductor of the one conductor pair is the feed-conductor and the other one is the return-conductor for the feed current. Each repeater for each transmission direction comprises an observation device including a relay which for defects in the repeater short-circuits, by a make contact, special line pairs, one for each transmission direction, included in the transmission cable for the actual transmission direction in order to send an alarm signal to a terminal station.

In carrier frequency systems the transmission of signals often occurs between two so called terminal stations through coaxial cables. For the transmission at least one coaxial pair is required. Accordingly, a coaxial tube is then necessary for each transmission direction. The signals are amplified on the way between the terminal stations by so called intermediate repeater station, which are connected at determined distances along the transmission path. Thus it is of great importance that, if a fault arises in a repeater station amplifier, an alarm is given to the observing terminal stations so that it is possible to localize the defective amplifier from these stations.

The frequency band transmitted between the two terminal stations is supervised by a so-called pilot signal. The level of this signal is scanned in every intermediate repeater station by a so-called pilot receiver, which comprises a relay which is connected for so long a time as a predetermined level of pilot signal exists. At level faults, the relay releases closing a contact set and short-circuits a conductor pair in the cable, which conductor pair is specially intended for alarm transmission. The transmission cable includes two so-called alarm pairs, one for each transmission direction. In the terminal station an indication of defects in any of the intermediate repeaters is obtained by short-circuiting the alarm pairs. By connecting for instance a so-called Wheatstone-bridge to the alarm pairs, which bridge is graduated in the number of amplifier sections, the place of defect in the transmission distance will be located by resistance metering.

By transistorizing the intermediate repeaters it is most suitable to feed direct current to the intermediate repeaters by so-called series feeding. The inner conductor of one coaxial tube is then the feed-conductor for the current and as the return conductor the inner conductor of the other coaxial tube is used. By using the above-mentioned observation method with pilot receivers great difficulties have occurred in localizing the position of fault. From the terminal stations it can only be determined whether the transmission path that is fed with power from the stations in question is broken or not.

An object of the present invention is that by retaining the pilot receiver observation an arrangement will be obtained which makes localizing of defective intermediate repeaters possible. This is of great importance as in the pilot receiver an adjustment of the level to a determined value takes place. According to the present invention this is achieved by providing a first relay for the repeater part concerned with signal transmission in the first direction and a second relay for the repeater part concerned with signal transmission in the opposite direction for each repeater station. Each relay is provided with two windings, the first one of said windings being connected in the respective direct voltage feeding conductor and the other one being connected between said feed-conductor and return-conductor for the direct current, and a break contact, which is connected in series with said make contact of the pilot receiver relay. The two windings of each relay are so formed that the relay connected to the repeater part in the first direction of the current supply will be energized only when there is voltage between the feeding conductors and when the feed current at the same time is zero, and that the relay connected to the repeater part in the opposite direction of the current supply will only be energized when the voltage between the feed conductors as well as the current in the feed conductors is zero.

Figure 2:
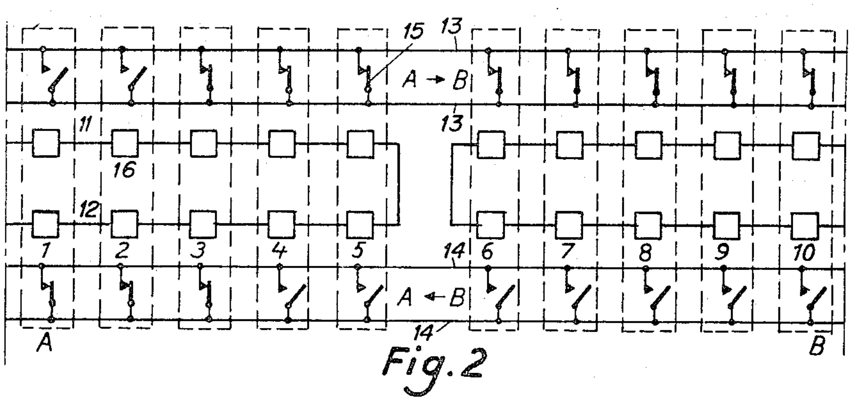
Figure 3:
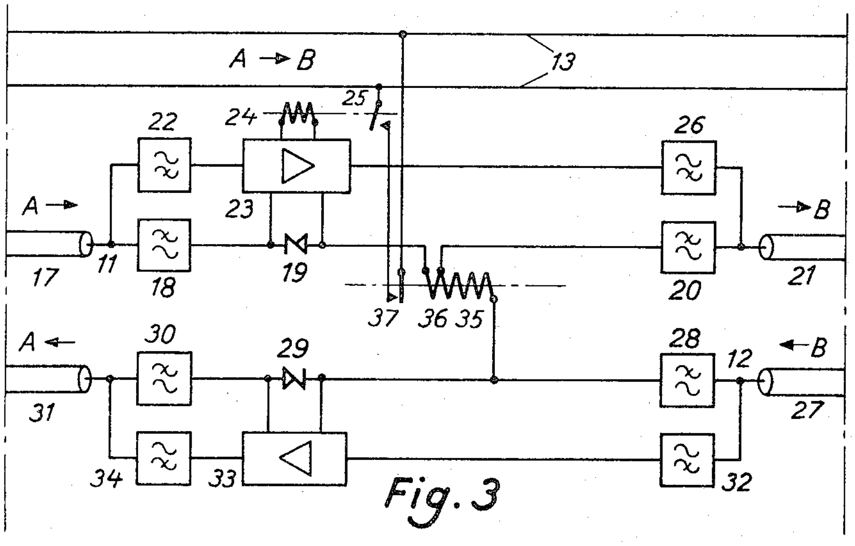
Figure 4:
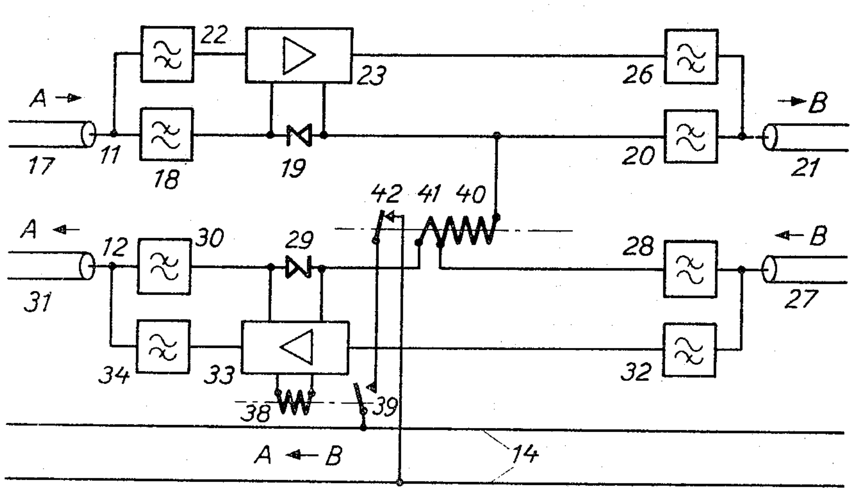

The invention will be further described in connection with the attached drawings, where FIG. 1 shows the principle for series feeding of a number of intermediate repeaters with the position of the alarm contacts given for faults in a repeater along the transmission path, FIG. 2 shows the position of the alarm contacts for faults in the same repeater station when using an arrangement according to the invention, FIG. 3 shows an arrangement according to the invention connected to the repeater part that is connected in the forward direction of the current supply, FIG. 4 shows the corresponding arrangement to the repeater part which is connected to the reverse direction of the current supply and FIG. 5 finally shows a complete arrangement according to the invention connected to an intermediate repeater station.

In FIG. 1 the principle of series feeding of a number of intermediate repeaters 1–10 is shown. The repeaters 1–5 are fed from a terminal station A, and the repeaters 6–10 are fed from a terminal station B. The feed current is then supplied to the inner conductor 11 in the coaxial tube which is used for transmission in the direction A–B and is returned through the inner conductor 12 in a coaxial tube which is used for transmission in the direction B–A. In each repeater station the repeater part 16 is therefore fed, which is the repeater part for the transmission direction in question. In FIG. 1 also the alarm pairs 13 and 14 are shown, which alarm pairs are used for the transmission A to B and B to A respectively. Between the two conductors of the alarm pair the make contact of the pilot receiver is connected so that if a fault arises in the repeater a shortcircuit of the alarm pair occurs. In FIG. 1 it is presumed that a fault has risen in the voltage supply to the intermediate No. 3 with respect to the repeater part for transmission from A to B. The make contacts 15 of the pilot receivers will thereby take the positions shown in the figure. Owing to the break in the voltage supply all the stations which are fed by the terminal station A will be currentless and consequently the relays of all the pilot receivers in this current supply chain release. Further in the intermediate repeater stations which are fed from the terminal station B the relays of the pilot receivers associated with the transmission direction A to B will release, due to a level drop in this transmission direction. With the alarm contacts in this position it is impossible to find the position of the fault in the transmission line either from the station A or from station B. From these stations it can only be decided if the respective current supply line is broken or not. In order to be able to perform a resistance metering which will result in localizing the position of the fault it is necessary that the make contacts of the pilot receiver relays have instead the positions indicated in FIG. 2. From this figure is clear that by a resistance metering from the A- respectively to the B-terminal station it is possible to decide where the defective intermediate repeater is situated. By using an arrangement according to the invention an alarm contact configuration according to FIG. 2 can be obtained. This occurs by determining the current ratio in and the voltage ratio between the feed conductors. Thereby the effect of such pilot receiver contacts will be prevented, which by their disconnection should make a metering of a defective intermediate repeater impossible. For the transmission direction A to B it means that the alarm pairs then should not be short-circuited if there is voltage between the feed conductors and the current in the feed conductor at the same time is zero. For the direction B to A it means that no short-circuiting shall take place when the voltage between the conductors is zero as well as when the current in the conductor is zero.

How such an arrangement for determination of these conditions is performed for the transmission direction A to B is clear from FIG. 3. For transmission in the direction A to B the coaxial tubes 17 and 21 are used and for the transmission B to A the tubes 27 and 31 are used. The direct current is supplied to the intermediate repeater through the inner conductor 11 and conducted back through the inner conductor 12. To the repeater part 23 for amplification in the direction A to B the necessary direct voltage is taken through a zener-diode 19 and to the corresponding part 33 in direction B to A through a zener-diode 29. The direct current- and high frequency paths are separated through filters 18, 20 and 22, 26 for direction A to B and 28, 30 and 32, 34 for direction B to A. The repeater part 23 includes a pilot receiver which contains a relay 24 with a make contact 25, which is connected to the alarm pair 13. In series with the direct current path a winding 36 is connected to a relay, suitably a polarized relay, and between the direct current conductors a further winding 35 is connected to the same relay. A break contact 37 belonging to the relay is connected in series with the make contact 25 which is connected to the alarm pair 13. The winding 36 monitors accordingly the current through the feed conductor 11 for the direction A to B and the winding 35 monitors the voltage between the feed conductors 11 and 12. The windings are so formed that the relay shall be influenced (contacts 37 make) only when the current in the feed conductor is zero and there is voltage between the feed conductors, but not when the voltage as well as the current are zero. If the relay is of the polarized type, the winding 36 shall be so formed that the generated flux has the same direction as the permanent flux in the relay and furthermore that the fluxes be almost equal. The winding 35 shall be so formed that the flux obtained from this winding shall be opposite the permanent flux and at a maximum voltage between the feed conductors this flux must be almost equally as large as the permanent flux. Hereby the relay will only be influenced when the current is zero and there is a voltage at the same time between the feed conductors, whereby the make contacts of the pilot receiver relays are prevented from short circuiting the alarm pair 13 in question when the pilot signal is interrupted. A corresponding arrangement connected to the repeater part for amplification in the direction B to A is shown in FIG. 4. The relay 38, which is a part of the pilot receiver in the repeater part 33 for amplification from B to A has a make contact 39 connected to the alarm line pair 14. In series with this make contact 39 a break contact 42 is connected to a relay, suitably polarized, which relay is provided with two windings 40 and 41. The winding 41 is then connected to the direct current path and the winding 40 is connected between the conductors fed with direct current. The current winding 41 is then so formed that the flux obtained from this winding will be opposite the permanent flux and of almost the same magnitude as the permanent flux. The voltage winding 40 is so formed that the flux of this winding will be opposite the permanent flux, and at maximal voltage between the feed conductors, the flux will be almost equal to the permanent flux. Hereby the relay will be influenced only when the current in the feed conductor is zero as well as when the voltage between the feed conductors is zero.

Figure 5:
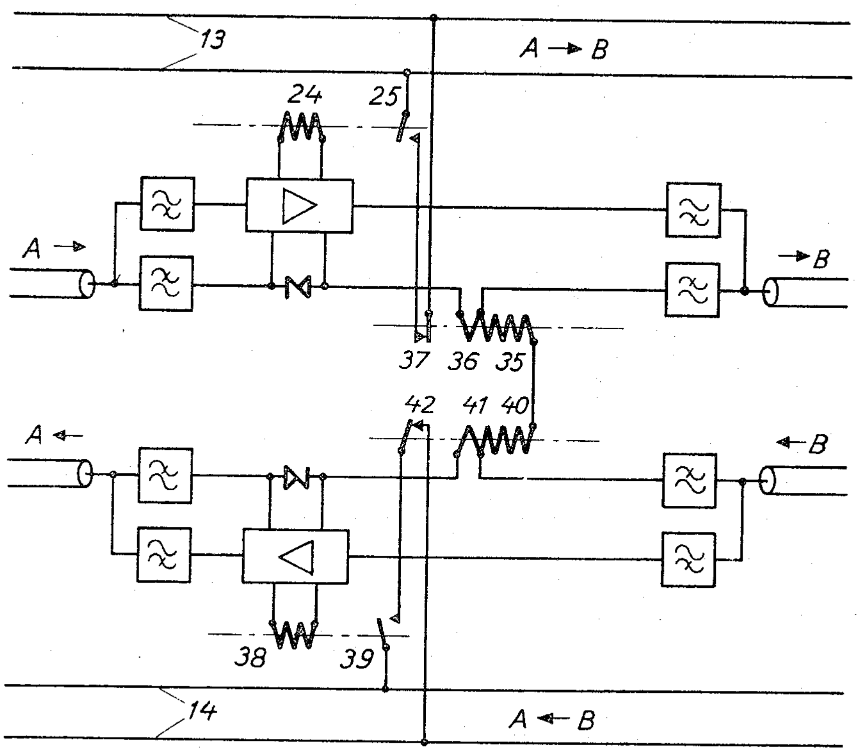

A complete arrangement for indicating a defective intermediate repeater is indicated in FIG. 5, where arrangements according to the invention are connected in the two transmission directions. For the transmission direction A to B a relay is used which has a break contact 37 connected in series with the make contact 25 of the pilot relay to the alarm pair 13. The current controlled winding 36 of the relay is further connected to the current supply path and the voltage controlled winding 35 of the relay is connected in series with the corresponding voltage winding 40 of a relay used for the transmission B to A between the two current feeding conductors. The current controlled winding 41 of this latter relay is connected to the current supply path for the transmission direction B to A, and the break contact 42 of the relay is connected in series with the make contact 39 of the pilot receiver relay to the alarm pair 14.

In the foregoing has been mentioned that the relays should suitably be polarized. For the relay functions here in question it is not necessary but very suitable due to the very low power consumption of the polarized relays. Further the voltage controlled winding of the relay could be so formed that its shunting on the voltage supply will be inconsiderable, which is of great importance for system lines fed with direct current. Relays of the same performance can furthermore be used in both of the line branches along the whole transmission line.

The arrangement does not impose any critical limits for the relays and therefore no large demands for maintenance are necessary at working. Further the arrangement brings the advantage that no relay contacts are included in the current supply path which relays could imperil the reliability in running.

Another method of solving the problem described above is to provide a local voltage in every intermediate repeater and to automatically switch over to this defects in the ordinary voltage supply. This alternative is, however, very uneconomical. A further alternative is to let the voltage supply path be unbroken between the A- and B-station. The supply sets in the A- and B-station work thereby in series, but at breakage a short-circuit is arranged by relays on both sides of the position of fault, so that the feeding voltage is supplied from the set in the A-station on the A-side of the position of fault and from the set in the B-station on the B-side of the position of fault. Thereby it is necessary to work with constant current feeding and difficulties arise then at normal running when two constant current sets shall work in series.

Furthermore for both of these methods the voltage feeding occurs in all the intermediate repeaters through relay contacts, thus, imperiling the reliability of operation of the transmission line.

The described arrangement in accordance with the invention eliminates all these drawbacks and makes the earlier used simple observation principle fit for use also at intermediate repeaters fed in series.

We claim:

1. A circuit arrangement for indicating a fault in a bidirectional carrier frequency signal transmission wherein signal transmission in each direction is monitored by a pilot signal system having a first conductor pair for signal transmission in one direction;

a second conductor pair for signal transmission in an opposite direction;

a plurality of repeater stations disposed along the first and second conductor pairs, each of said repeater stations including a first direct current energized repeater unit for amplifying signals transmitted in the first direction and a second direct current energized repeater unit for amplifying signals transmitted in the opposite direction, said first repeater units being serially connected along said first conductor pair, and said second repeater units being serially connected along said second conductor pair, one conductor of said first conductor pair being the direct current supply conductor for said first repeater units, and the direct current return conductor for said second repeater units, and one conductor of said second conductor pair being the direct current supply conductor for said second repeater units and the direct current return conductor for said first repeater units said circuit arrangement comprising a first pair of fault indicating lines associated with signal transmission in said first direction, a second pair of fault indicating lines associated with signal transmission in the opposite direction, a plurality of first and second switching circuits connected in series across said first pair of fault indicating lines, each of said serially connected first and second switching circuits being associated with the first repeater unit of one of said repeater stations respectively, a plurality of first control means, each of said first control means being associated with the first repeater unit of one of said repeater stations respectively and responsive to the pilot signal in the first direction for closing the first switching circuit of the associated repeater station when said pilot signal falls below a certain level, a plurality of second control means, each of said second control means being associated with the first repeater unit of one of said repeater stations respectively and responsive to the direct current energizing said first repeater unit and the voltage across said one conductor of said first conductor pair for opening the second switching circuit of the associated repeater station only when the direct current energizing said first repeater unit is zero and the voltage across said one conductors of said conductor pairs is zero, a plurality of third and fourth switching circuits connected in series across said second pair of fault indicating lines, each of said serially connected third and fourth switching circuits being associated with the second repeater unit of one of said repeater stations respectively, a plurality of third control means, each of said third control means being associated with the second repeater unit of one of said repeater stations respectively and responsive to the pilot signal in the second direction for closing the third switching circuit of the associated repeater station when said pilot signal falls below a certain level, and a plurality of fourth control means, each of said fourth control means being associated with the second repeater unit of one of said repeater stations respectively and responsive to the direct current energizing said second repeater unit and the voltage across said one conductor of said first conductor pair and said one conductor of said second conductor pair for opening the fourth switching circuit of the associated repeater station only when the direct current energizing said second repeater unit is zero and a voltage exists across said one conductors of said conductor pairs.

2. The circuit arrangement of claim 1 wherein each of said first control means is one of a plurality of first relays and each of said first switching circuit includes the contact set of one of said first relays respectively, and each of said third control means is one of a plurality of second relays and each of said third switching circuits includes the contact set of one of said second relays respectively.

3. The circuit arrangement of claim 1 wherein each of said second control means is one of a plurality of first relays including two windings, one of said windings being connected across said one conductors of said first and second conductor pairs, the other of said windings being connected in series with said one conductor of said first conductor pair, each of said second switching circuits including the contact set of one of said first relays respectively, and each of said fourth control means is one of a plurality of second relays including two windings, one of the windings being connected across said one conductors of said first and second conductor pair, the other of the windings being connected in series with said one conductor of said second conductor pair.

No references cited.

KATHLEEN H. CLAFFY, *Primary Examiner.*

A. A. McGILL, *Assistant Examiner.*